UNITED STATES PATENT OFFICE

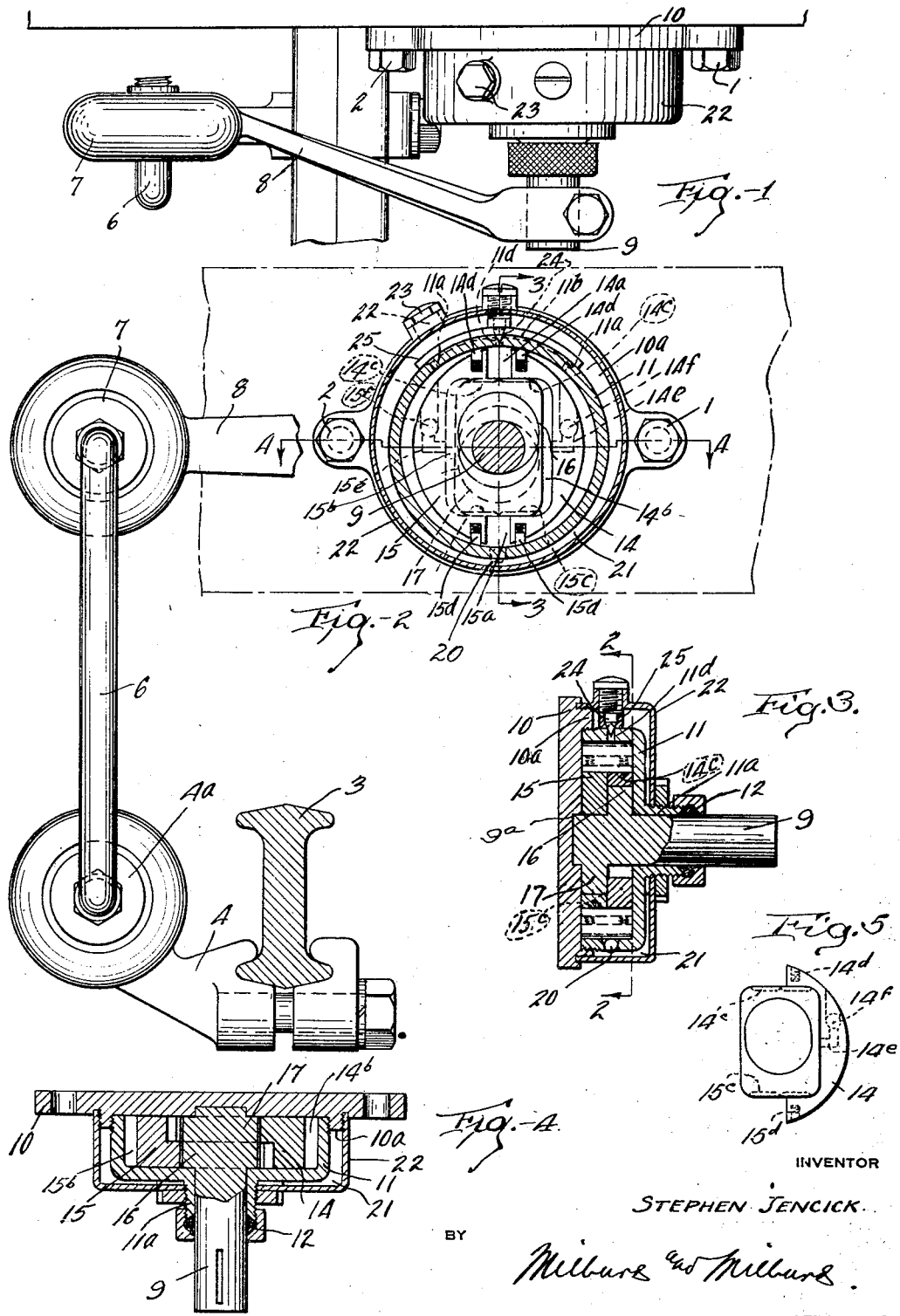

STEPHEN JENCICK, OF CHAGRIN FALLS, OHIO

HYDRAULIC SHOCK ABSORBER

Application filed January 14, 1929. Serial No. 332,415.

This invention relates to an improved form of hydraulic shock absorber adapted for use upon an automobile, truck, or the like.

As is well known to those who are familiar with the art to which the present invention relates, in this type of device, the shock absorber itself is fixedly mounted upon the frame of the automobile or the like, and has lever connections with the axle of the car. In the present case, upon relative movement between the frame of the car and the axle, when, for instance, the automobile encounters a depression in the roadway, the actuation of the lever connections causes relative movement between the parts of the shock absorber itself and thereby causes compression of the oil or other fluid which may be employed as the compression medium for absorbing the shock. This will be explained more fully.

The object of the present form of invention is to devise a hydraulic shock absorber of the type in which relative rotary movement between the parts thereof is converted into reciprocating movement of a plunger or piston contained therein, said parts being so constructed and arranged as to effect a maximum degree of compression for a given degree of relative rotary movement between the parts, or, in other words, for a given relative movement between the frame of the automobile and the axle.

Another object consists in devising such a structure of minimum proportions so as to require a minimum space for installation and also minimum space for movement of the parts during operation.

Another object consists in providing such a shock absorber which can be applied to any size of automobile, truck, or the like, which will operate under all conditions without danger of binding and locking between the parts and which can be depended upon for efficient operation during all seasons of the year regardless of the change in temperature.

A further object consists in devising such a form of shock absorber which can be marketed at comparatively low cost and which is therefore available for use upon the less expensive as well as the better grades of automobiles.

Other objects will appear from the following description and claims when considered together with the accompanying drawings.

Fig. 1 is a plan view of my improved device; Fig. 2 illustrates an installation of my present form of structure upon an automobile with parts of the shock absorber itself shown in section (line 2—2, Fig. 3), while the lever connections are shown in side elevation; Fig. 3 is a section taken on line 3—3, Fig. 2; Fig. 4 is a sectional view taken on line 4—4 of Fig. 2; and Fig. 5 is a view of one of the plunger plates.

The present disclosure illustrates another specific form of the same general type of device of which one specific form is disclosed in my copending application, Serial No. 253,132, filed February 9, 1928.

The casing of the shock absorber itself is secured to the frame of the car at the diametrically opposite points 1 and 2 by means of screws or bolts. The axle 3 of the automobile has secured thereto one end of a transversely disposed arm 4, the other end of which has universal connection at the point 4ª with the upwardly extending lever arm 6. The upper end of lever 6 has universal connection at the point 7 with the transversely disposed lever arm 8 which is fixed at its other end to the axially disposed shaft 9 which forms part of the shock absorber itself. Relative movement between the frame of the car and the axle 3 through the several lever connections just now referred to, causes rotary movement of the arm 9 so as to effect relative movement between the parts contained within the casing of the shock absorber.

The shock absorber casing comprises the rear plate 10 which is secured to the frame of the car at the points 1 and 2 and which has an annular outwardly extending flange portion 10ª, to the inner side of which there is secured by screw-threaded engagement the annular flange of the cover 11. The outer wall of this cover 11 has an axially disposed flange 11ª through which extends the shaft 9 for operation of the parts which are contained within the casing chamber provided between the cover 11 and the rear plate 10. Suitable packing is provided at the point 12.

Arranged within the chamber are the overlapping reciprocating plunger plates 14 and 15 which together constitute the plunger means actuated by rotary movement of the shaft 9. The outer surfaces of the members 14 and 15 are curved about the same center as the inner cylindrical surface of the flange wall of the cover 11. Straight line movement of the plunger members 14 and 15 in a direction toward the corresponding surface portions of the cover 11 is adapted to effect compression of the oil therebetween and to produce the checking action of the shock absorber. The outer portions of the plunger members 14 and 15 are of full thickness corresponding to the space between the parallel walls of the rear plate 10 and the cover 11, while the inner overlapping portions thereof are of half thickness so as to permit sliding overlapping engagement between the same within the casing, while at the same time having snug sliding engagement between the oppositely disposed parallel walls of the casing. As will be seen from the drawing, the plates 14 and 15 are substantial duplicates and each of them stops short of the vertical diameter through the casing, as view in Fig. 2 of the drawings, so as to permit inward movement of the plates 14 and 15 toward each other and to also provide oil chambers 14ª, 15ª at the top and bottom, as viewed in the drawings. The central portions which are of half thickness, are of substantially rectangular form with curved corners which are adapted for nesting engagement when occupying inner or withdrawn position and which, at the same time, afford intermediate spaces 14ᵇ and 15ᵇ to serve as oil chambers except when in inner or withdrawn position. Ports 14ᶜ and 15ᶜ afford communication between chambers 14ª, 15ª, and 14ᵇ and 15ᵇ.

The plates 14 and 15 are actuated so as to move along a straight line away from each other by means of the eccentrics 16 and 17, respectively, each of which has cooperative seating engagement in the central portions of the plates 14 and 15, respectively. The eccentrics 16 and 17 are fixedly mounted on the inner end portion of the shaft 9 which has bearing engagement at the point 9ª in the inner side of the plate 10. These parts are so constructed and arranged that upon relative rotary movement of the shaft 9, the two eccentrics will effect operation of the plates 14 and 15 in opposite directions so as to both at the same time cause compression of the oil between the outer curved surfaces of the plates and the corresponding portions of the inner curved surface of the wall of the cover 11. Then, upon reverse relative rotative movement of the shaft 9, the plates 14 and 15 are withdrawn inwardly so as to relieve the outer compression and so as to approach each other toward the middle part of the casing. The position of the plates, as indicated in Fig. 1 of the drawings, corresponds to neutral position.

Each of the plunger plates 14 and 15 is provided at opposite points with an autovided with an angular-shaped port 14ᵉ and 15ᵈ, each of which includes a spring to automatically force the sealing element outwardly against the inner surface of the curved wall of the cover 11 during all positions of the plates 14 and 15. Thus, during all stages of reciprocating movement of the plates 14 and 15, there is maintained an effective sealing engagement between the curved surfaces of these plates and the inner wall of the cover 11.

Each of these plates 14 and 15 is also provided with an angular-shaped port 14ᵉ and 15ᵉ extending through from the inside to the outside thereof so as to afford a passage for the oil from the inside of the plates to the outside thereof, as will later appear. The outer portions of these ports are enlarged so as to afford a seat for the ball valves 14ᶠ and 15ᶠ which are so arranged as to permit passage of the oil inwardly through the ports to the inside of the plates but not outwardly. In other words, during the movement of these plates for compression of the oil upon the outside thereof, the ball valves are automatically maintained in closed position.

As a means of automatically replenishing the supply of oil in the chamber, there is provided the ball valve 20 which seats in an opening through the wall of the cover 11 so as to control the passage of oil through this opening from the reservoir 21 which is enclosed within the cover 22 secured by screw threaded engagement upon the outside of the flange 10ª. Ball 20 may be retained in place in any suitable manner. Thus, it will be seen that oil may be drawn from the reservoir 21, by means of suction caused by operation of the plates 14 and 15, whenever occasion may demand. The supply of oil to the reservoir 21 may be replenished by means of an opening through the cover 22 which is closed by the screw plug 23. As a means of restricting passage of the oil, during compression, from the outer side of the plates 14 and 15 to the spaces provided upon the inner sides thereof, I have provided the channel 11ᵇ in the outer wall of the cover 11, the outer ends of this channel being extended in the form of ports 11ᶜ through the wall of the cover 11 so as to open into the outer compression chambers between the oppositely disposed walls of the plates 14 and 15 and the cover 11. There is also provided a port 11$^d$ through the wall of the cover 11 so as to provide communication from the channel 11$^b$ to the upper space between the inner sides of the plates 14 and 15. Thus, when the plates 14 and 15 are moved outwardly so as to effect compression for absorbing the shock, the oil may pass through the restricted passage which, in each case, comprises the ports 11$^a$, the channel 11$^b$ and the port 11$^d$, thereby passing from the outer chambers to the inner chambers. Because of the very restricted nature of this passage-way in each case, there is obtained a very high degree of compression with the result that the shock which would otherwise be set up by relative movement between the frame and axle of the automobile is effectively absorbed. Furthermore, I have provided a means for regulating the degree of opening through the passage-way just now referred to so that the degree of compression may be varied according to the duty corresponding to the particular automobile, truck, or the like upon which the shock absorber is installed. This means of adjustment comprises a needle valve 24 which extends through the wall of the cover 22 and is capable of manipulation from the outside of the shock absorber casing. The needle valve 24 is screw-threaded through the plate 25 which is secured by welding to the outer surface of the flange of the cover 11 so as to permit operation of the needle valve without escape of the oil. This plate 25 thereby constitutes one wall of the channel 11$^b$.

The parts are so constructed and arranged that downward movement of the body of the car, upon encountering a depression in the roadway, for instance, will, through the lever connections, cause relative rotary movement of the arm 9 and inward straight-line movement of the plates 14 and 15 so as to compress the oil in the inner chambers above referred to. This compression is sufficient to check such relative movement between the body and axle of the automobile so as to ensure smooth riding motion of the automobile at all times. During such compression, the oil in the inner chambers is permitted to pass out through the ports 14$^e$ and 15$^e$ and the channel 11$^b$. Then upon the body of the automobile beginning to move upwardly, due to the action of the automobile springs, there will be compression in the outer chambers, the only avenue of escape for the oil being then through the very restricted passage, including the channel 11$^b$, which may be regulated to suit various sets of conditions. The maximum compression is produced at this time so as to prevent the objectionable "rebound" which would otherwise occur. The present illustration shows the parts in neutral position.

As indicated in the drawing, the diametrical path of movement of the plunger members corresponds with the line between the points of attachment of the casing; and the strain upon such points is reduced to a minimum.

Thus, I have devised a form of hydraulic shock absorber which is calculated for long life without requiring any attention, renewal of parts, or replenishing of the hydraulic fluid during a long period of usage, and which is designed to produce maximum compression and hence a maximum degree of shock absorbing effect for a given relative movement between the parts. Furthermore, the shock absorbing effect thereby produced may be depended upon under all conditions and it can be regulated as may be desired for any given set of conditions; hence the present device possesses a very great degree of flexibility which renders it suitable for application upon various types of automobiles, trucks, and the like. Finally, the comparatively compact form of structure with minimum required amount of space for installation and operation as well as comparatively low cost to the consumer are thought to constitute further advantages of the present invention.

What I claim is:

1. A shock absorber comprising a fluid-containing casing adapted for connection to one part of an automobile or the like, a plurality of plunger members within said casing, said casing and members being adapted for relative radial reciprocating movement therebetween and having oppositely disposed compression surfaces, rotatable means adapted for connection to a relatively movable part of an automobile or the like for causing relative movement between said compression surfaces towards and from each other so as to vary the compression of the fluid therebetween, and means of communication between opposite sides of the individual plunger members for the fluid so as to permit compression of the fluid also between said plunger members.

2. A shock absorber comprising a fluid-containing cylindrical casing adapted for connection to one part of an automobile or the like, a plurality of reciprocable plunger members within said casing, said plunger members having diametrically disposed curved surfaces for cooperation with the curved wall of the casing so as to afford compression chambers for the fluid, rotatable means connected to a relatively movable part of the automobile or the like for causing actuation of said plunger members in opposite directions, and means of communication between opposite sides of the individual plunger members for the compression fluid so as to permit compression of the fluid also between said plunger members.

3. A shock absorber comprising a fluid-containing casing adapted for connection to one part of an automobile or the like, a plurality of plunger members within said casing, said casing and members being adapted for relative radial reciprocating movement therebetween and having oppositely disposed compression surfaces, rotatable cam means having operative connection with a relatively movable part of the automobile or the like for causing actuation of said plunger members, and means of communication between opposite sides of the individual plunger members for the compression fluid so as to permit compression of the fluid also between said plunger members.

4. A shock absorber comprising a fluid-containing cylindrical casing adapted for connection to one part of an automobile or the like, a plurality of reciprocable plunger members within said casing, said plunger members having diametrically disposed curved surfaces for co-operation with the wall of the casing, said plunger members having overlapping inner portions, a rotatable shaft extending through said overlapping portions and having operative connection with a relatively movable part of the automobile or the like, means carried by said shaft and adapted for actuation of said plunger members, and means of communication between opposite sides of the plunger members for the fluid.

5. A shock absorber comprising a fluid-containing cylindrical casing adapted for connection to one part of an automobile or the like, a plurality of plunger members within said casing, said casing and members being adapted for relative radial reciprocating movement therebetween and having oppositely disposed curved surfaces, rotatable means adapted for connection to a relatively movable part of an automobile or the like for causing like relative movement between each pair of said curved surfaces towards and from each other so as to vary the compression of the fluid therebetween, and restricted means of communication for the compression fluid between opposite sides of said individual plunger members during the period of rebound.

6. A two-way shock absorber comprising a fluid-containing cylindrical casing adapted for connection to one part of an automobile or the like, a plurality of plunger members within said casing, said casing and members being adapted for relative radial reciprocating movement therebetween and having oppositely disposed curved surfaces, there being one-way means of communication effective for passage of fluid from the inner to the outer sides of the individual plunger members during the initial period, and a restricted means of communication for the compression fluid between opposite sides of said individual plunger members effective during the period of "rebound".

7. A shock absorber comprising a fluid-containing cylindrical casing adapted for connection to one part of an automobile or the like, a plurality of reciprocable plunger members, said plunger members having diametrically disposed curved surfaces for cooperation with the wall of the casing, a rotatable shaft having connection with a relatively movable part of the automobile or the like for effecting movement of said plunger members, an eccentric mounted upon said shaft for each of said plunger members, the inner portions of said plunger members overlapping and each having an eccentrically formed seat for its corresponding eccentric for cooperation therewith in the actuation of said plunger members, and means of communication between opposite sides of the said plunger members for the compression fluid.

8. A shock absorber comprising a cylindrical casing having diametrically arranged means of attachment to a part of an automobile or the like, reciprocable plunger members movable along a path corresponding with the line between said means of attachment, rotatable means having cooperative engagement with a relatively movable part of the automobile or the like for effecting movement of said plunger members for compression of fluid, and means of communication between opposite sides of said plunger members for the compression fluid.

9. A shock absorber comprising a fluid-containing casing adapted for attachment to one part of an automobile, reciprocable plunger members for effecting compression of fluid, rotatable means having operative engagement with a relatively movable part of the automobile for effecting actuation of said plunger members, the oppositely disposed compression surfaces of said casing and plunger members being of curved form, a fluid reservoir surrounding said casing, and means for automatically supplying fluid from said reservoir to said casing.

10. A shock absorber comprising a fluid-containing cylindrical casing adapted for connection to one part of an automobile or the like, a plurality of plunger members within said casing, said casing and members being adapted for relative radial reciprocating movement therebetween and having oppositely disposed curved surfaces, and adjustable restricted means of communication for the compression fluid between opposite sides of said plunger members during the period of rebound.

11. A shock absorber comprising a fluid-containing cylindrical casing adapted for attachment to one part of an automobile or the like, plunger members having curved outer surfaces arranged for reciprocating movement in said casing in a direction at right angles to the axis of the casing, means of communication between the inner and outer sides of the plunger members, and rotatable means connected to a relatively movable part of the automobile for effecting actuation of the plunger members.

12. A shock absorber comprising a cylindrical fluid-containing casing, plunger members having outer curved surfaces for cooperation with the curved wall of the casing for compression of the fluid, said plunger members being arranged for reciprocating movement across the axis of said casing, self-adjusting sealing means provided between the inner portions of the compression chamber between said curved walls, means of communication between the opposite sides of said plunger members for the fluid, and rotatable means operatively connected to a relatively movable part of the automobile for effecting actuation of said plunger members.

13. A shock absorber comprising a cylindrical fluid-containing casing, plunger members having outer curved surfaces for cooperation with the curved wall of the casing for compression of the fluid, said plunger members being arranged between the end walls of said casing and adapted for reciprocating movement across the axis of said casing, said plunger members having overlapping inner portions, a rotatable shaft extending through one end wall of the casing and through said overlapping portions and having bearing in the opposite end wall of said casing, eccentric actuating means for said plunger members having operative engagement with said shaft for operation thereby, said shaft having connection with a relatively movable part of the automobile, and means of communication between opposite sides of said plunger members for the compression fluid.

14. A shock absorber comprising a fluid-containing casing adapted for connection to one part of an automobile or the like, a plurality of plunger members within said casing, said casing having oppositely disposed curved surfaces, said members being adapted for reciprocating movement and having curved surfaces oppositely disposed with respect to the curved surfaces of the casing, rotatable means adapted for connection to a relatively movable part of an automobile or the like for causing movement of said members towards and from the curved surfaces of the casing so as to vary the compression of the fluid therebetween, and means of communication between opposite sides of the individual plunger members for the fluid so as to permit compression of the fluid also between said plunger members.

15. A shock absorber comprising a fluid-containing casing adapted for connection to one part of an automobile or the like, a plurality of plunger members within said casing, said casing having oppositely disposed curved surfaces, said members being adapted for reciprocating movement and having curved surfaces oppositely disposed with respect to the curved surfaces of the casing, rotatable cam means having operative connection with a relatively movable part of the automobile or the like for causing actuation of said plunger members, and means of communication between opposite sides of the individual plunger members for the compression fluid both between said surfaces and between said plunger members.

16. A two-way shock absorber comprising a fluid-containing casing adapted for connection to one part of an automobile or the like, a plurality of plunger members within said casing, said casing having oppositely disposed compression surfaces, said members being adapted for reciprocating movement and having compression surfaces oppositely disposed with respect to the compression surfaces of the casing, rotatable means adapted for connection to a relatively movable part of an automobile or the like for causing movement of said members towards and from the compression surfaces of the casing, so as to vary the compression of the fluid therebetween, there being one-way means of communication effective for passage of fluid from the inner to the outer sides of the individual plunger members during the initial compression, and an adjustable restricted means of communication for the fluid between opposite sides of said individual plunger members effective during the period of "rebound".

17. A two-way shock absorber comprising a fluid-containing casing adapted for connection to one part of an automobile or the like, a plurality of plunger members within said casing, said casing having oppositely disposed curved surfaces, said members being adapted for radial reciprocating movement and having curved surfaces oppositely disposed with respect to the curved surfaces of said casing, there being one-way means of communication effective for passage of fluid from the inner to the outer sides of the individual plunger members during the initial compression, and an adjustable restricted means of communication for the compression fluid between opposite sides of the individual plunger members effective during the period of "rebound".

18. A shock absorber comprising a fluid-containing casing adapted for connection to one part of an automobile or the like, a plurality of plunger members within said casing, said casing having oppositely disposed curved surfaces, said members being adapted for radial reciprocating movement and having curved surfaces oppositely disposed with respect to the curved surfaces of said casing, and adjustable restricted means of communication for the compression fluid between opposite sides of said individual plunger members during the period of "rebound".

In testimony whereof, I hereby affix my signature.

STEPHEN JENCICK.

Certificate of Correction

Patent No. 1,808,924.                                                              Granted June 9, 1931, to

STEPHEN JENCICK

It is hereby certified that error appears in the printed specification of the above-numbered patent requiring correction as follows: Page 2, line 78, strike out the syllable and words " vided with an angular-shaped port $14^e$ " and insert instead the syllable and words—*matically adjustable sealing means $14^a$;* and that the said Letters Patent should be read with this correction therein that the same may conform to the record of the case in the Patent Office.

Signed and sealed this 4th day of August, A. D. 1931.

[SEAL.]

WM. A. KINNAN,
*Acting Commissioner of Patents.*